Figure 1:
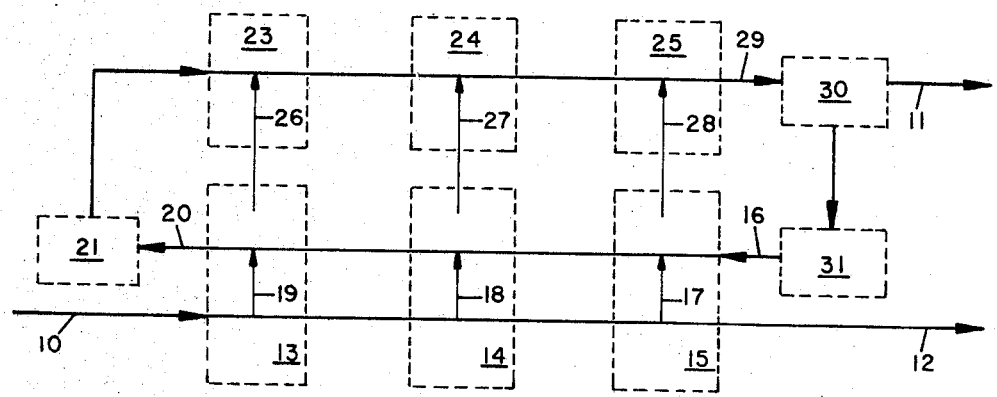

Oct. 31, 1967  B. B. CARR  3,350,298
PROCESS FOR RECOVERY OF WATER FROM SALINE SOLUTIONS
Filed Oct. 29, 1963  2 Sheets-Sheet 1

INVENTOR.
B. B. CARR
BY Donald L. Rose

United States Patent Office 3,350,298
Patented Oct. 31, 1967

3,350,298
PROCESS FOR THE RECOVERY OF WATER FROM SALINE SOLUTIONS
Bruce B. Carr, Pittsburgh, Pa., assignor to Callery Chemical Company, Pittsburgh, Pa., a corporation of Pennsylvania
Filed Oct. 29, 1963, Ser. No. 319,882
13 Claims. (Cl. 210—21)

My invention relates to a novel method for the recovery of water from saline water solutions.

Many processes for the recovery of potable water from saline water solutions based upon many different physical-chemical phenomena have been proposed. Furthermore, many plants are in actual usage throughout the world for fresh water production or for pilot plant study utilizing various principles of water separation. In short, there is no scarcity of processes or ideas for the separation of water from saline waters. The objective has been and continues to be a steady lowering of the cost of potable water from saline water by improving existing processes or through novel process approaches. The cost of such produced fresh water is based upon a combination of three main cost factors, that is, the capital cost of a purification plant, energy requirements for the plant, and the operating costs for the plant. More specifically, the objective is to reduce the overall cost of purified water, usually calculated as the cost per 1000 gallons, by a reduction of any one of the cost factors and preferably all three. By my invention I have provided a process by which all three cost factors have been reduced so that the production of fresh water has been made more economically possible. Of particular advantage is the lower capital investment in large size conversion plants permitted by my process.

Desalinization of water involves the transfer of both mass and energy across a physical barrier. The total energy which must be transferred in an extraction process is inherently less than that which must be transferred in a process in which water is separated by vaporization because the latent heat of solution is much less than the latent heat of vaporization. According to my invention relative simplicity and savings are accomplished by effecting mass transfer through a liquid-liquid interface and by effecting energy transfer by direct contact vaporization and condensation. Solvent extraction techniques are utilized in which the solution and dissolution of water occurs simultaneously and at approximately the same relatively low temperature level with a consequent saving of the heat of solution of water in the solvent. Furthermore, operation at a low temperature not only avoids scale formation but also permits greater concentration of salt with an overall reduction of liquid flow in the system as well as a substantial elimination of equipment corrosion. In addition, utilizing the advantages offered by the flash evaporation of a low boiling material in a direct contact, latent heat transfer system is a novel concept in saline water conversion. The combination of all of these concepts into an integrated, continuous, and cyclic process results in a smaller plant with less heat transfer surface and other expensive equipment required to produce a given quantity of water at reduced energy load and reduced maintenance costs.

An object of my invention is to provide a process which combines the heat economy and equipment simplicity of multi-stage flash evaporation with the minimum total heat transfer and direct contact advantages of liquid extraction.

Another object of my invention is to provide a process for the extraction of water from saline water which minimizes the need for capital equipment.

An additional object of my invention is to provide a process for extracting water from saline water which is energy conserving, and which is economical in operation.

A further object of my invention is to provide such a process which operates at low temperatures with no scale formation and minimized equipment corrosion.

Other objects will become obvious from the following description of the invention.

Figure 3:
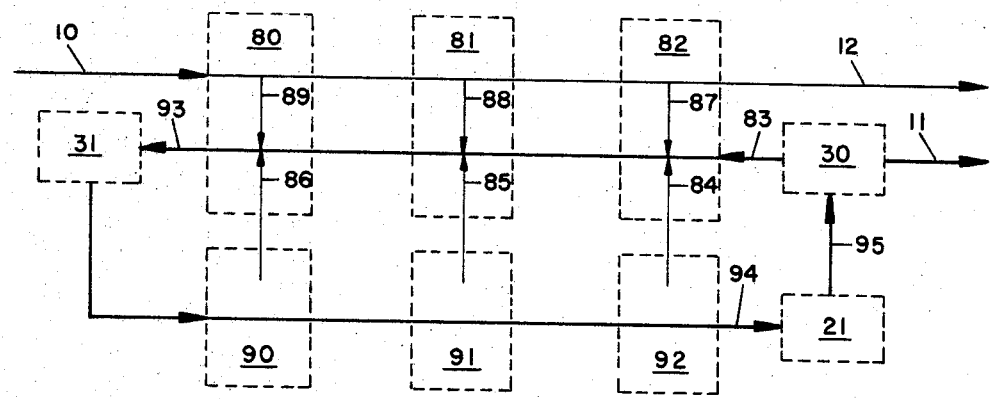
Figure 2:
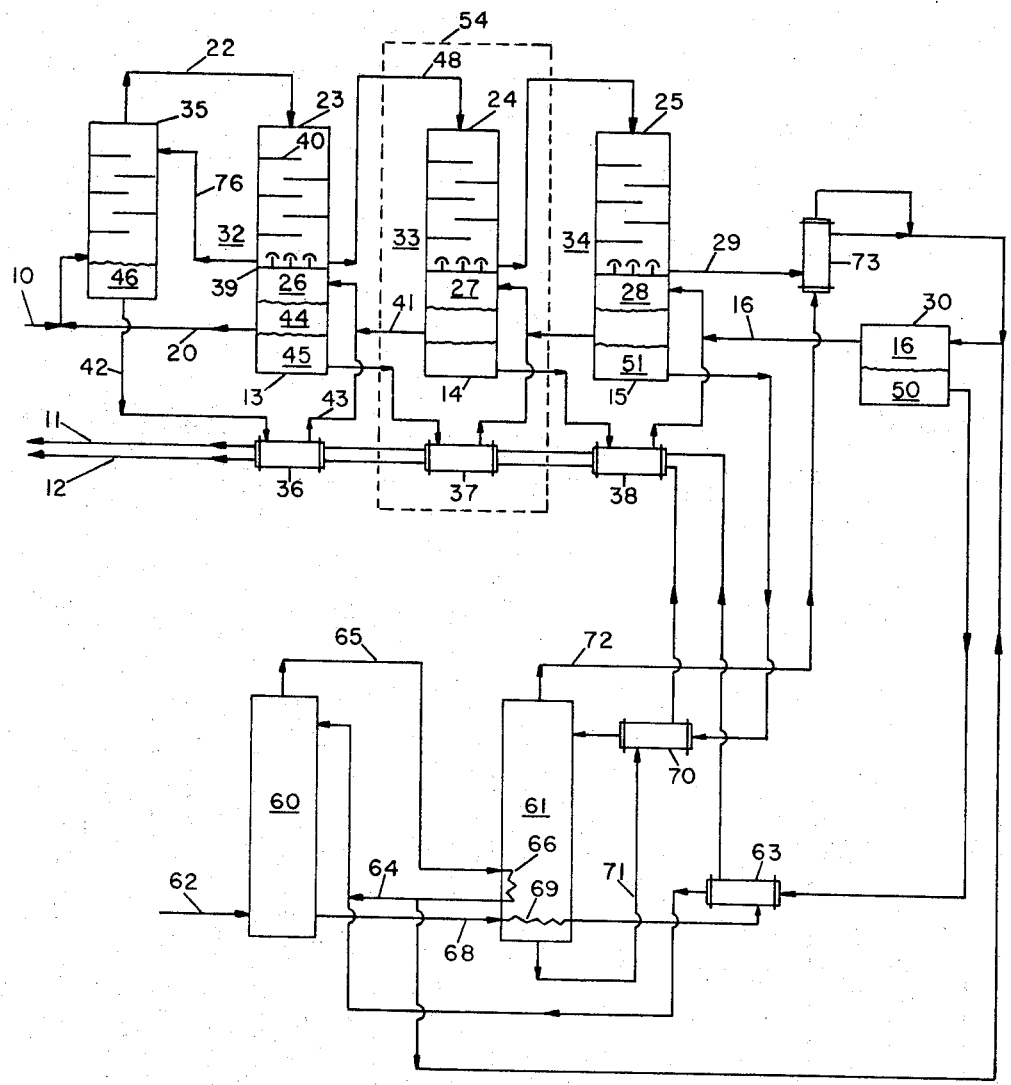

FIGURE 1 is a simplified schematic flow diagram for the purification of saline water by my invention. FIGURE 2 is a more detailed schematic flow diagram of the procedure illustrated in FIGURE 1. FIGURE 3 is a simplified flow diagram of a modification for purifying saline water by my invention.

The process will first be described in conjunction with FIGURE 1 which represents a simplified, ideal situation. Saline water 10 is fed to the system and purified water 11 and waste concentrated brine 12 are withdrawn. The feed such as sea water is introduced into a series of extraction stages or units, 13, 14 and 15 having an increasing pressure temperature in the direction of the brine flow in direct contact with a recycle solution 16 which contains a water solvent, flowing in a direction counter current to the brine solution. The recycle solution dissolves increments of water 17, 18 and 19 from the saline water as it progresses through each extraction stage, being water-rich as it leaves extraction unit 13. Concentrated waste brine 12 leaves extraction unit 15.

Heated recycle solution 16 which is introduced into extraction unit 15 contains a salting out or separation agent in solution which will preferentially dissolve into a solvent-water solution causing the water to separate out as a distinct phase. The pressure and temperature of extraction unit 15 is such that when the recycle solution is introduced into the unit a portion of the separation agent will flash evaporate and therefore, a portion 17 of the water in the saline solution is dissolved by the solvent. As the solvent-separation agent solution passes through unit 14 at a lower temperature and pressure an additional flash evaporation of the separation agent occurs and an additional solution of water 18 from the saline solution and a similar solution 19 occurs in unit 13.

The material 20 leaving the extraction zone is a water-rich solution which is cooled in 21 and introduced into a series of condensation separation stages or units, 23, 24 and 25 having an increasing temperature and pressure in the direction of solvent flow, but somewhat lower temperature than the extraction stage associated with each condensation stage, 13, 14 and 15 respectively. The separation agent vapor 26 from extraction unit 13, introduced into direct liquid-vapor contact with the solvent-water solution in condensation unit 23, condenses into the solvent causing a separation of some water into a water phase. As the two phases are fed through units 24 and 25 at increasing temperature and pressure, the vapor 27 and 28 from extraction units 14 and 15 is introduced into condensation units 24 and 25 respectively causing a further salting out or separation of water and a resulting increase in the water phase. The final material 29 leaving the condensation zone consists of a solvent-separation agent solution phase and a second phase of water. These two liquid phases are separated by a gravity separation technique in separator 30. The solvent-separation agent solution 16 is heated in 31 to provide the driving force for evaporation, and is recycled through the extraction zone for continuous operation of the process.

As previously stated this system of FIGURE 1 represents an idealized not an actual situation. In order to attain full process economies, heat must be extracted from both the purified water stream and the waste brine stream for reuse in the process. Furthermore, solvent as well as separation agent will dissolve to some extent in both the purified water and waste brine streams and must be recovered from both streams for full operating economy and from the purified water stream for the further reason of making it a usable product. This will be described later in greater detail in connection with FIGURE 2.

The procedure of FIGURES 1 and 2 involves four components, salt, water, solvent and separation agent. The nature and amount of salt component in the process depends on the particular brine source utilized such as, for example, sea water, coastal brackish water of varying composition, or subsurface brines of varying composition.

The solvent used may be selected within certain limits depending on the nature of the saline water to be purified, the ultimate use of the purified water, the stripping procedure desired, the heat source available as a driving force, and the particular equipment and operating preferences. The solvent must be miscible with the water, but it cannot be completely miscible at the operating temperatures. Preferably it should have a high solubility for water and a low solubility in water. The solvent must be selective and preferably should have a good selectivity, that is, the water dissolved in the solvent should have a significantly lower salt concentration than the original brine. Also the solvent must have a reduced solubility for water in the presence of the separation agent and preferably this reduction of solubility should be substantial. Other considerations affecting the selection of a practical solvent are its volatility, its viscosity, its cost, its pH in a water solution, its ease of recovery from water, its change of water solubility with temperature, and the compatibility of trace amounts of solvent in the water product with its ultimate use. Suitable solvents for this modification include the alkyl alcohols, ketones, amines, various blends or combinations of these groups and materials and other organic solvents having the desired characteristics which suit any particular or desired conditions of operation. Solvents such as amines which dissolve less water at elevated temperature have the advantage that water is recovered not only as a result of the salting out effect but also as a result of the temperature increase in the separation zone, thereby permitting a lower solvent recycle to be used, but have the disadvantage of high cost and a high pH in water solution. Also, the pretreatment of sea water to lower the magnesium content may be desirable when using an amine type solvent.

The salting out or separation agent must be soluble in the solvent, must cause water to separate out of a water-solvent solution, must be volatile at the temperature and pressure of operation, must be more volatile than the solvent and must not be miscible with water. The cost of the separation agent, its non-reactivity, its ease of recovery, and the compatibility of trace amounts in the water product are practical considerations affecting its selection. The selection of a separation agent is also affected by the desire to operate under pressure or slight vacuum in order to avoid the use of expensive vacuum pumps and equipment as well as to utilize the inherent advantages offered by the use of denser vapors than ordinarily present in flash evaporation to get an equivalent heat transfer. The list of suitable separation agents includes the paraffin hydrocarbons such as propane, butane, pentane and hexane. The halogenated hydrocarbons also offer attractive properties for this use. By using a hydrocarbon with a high vapor pressure such as propane, the vaporization-extraction and condensation-separation zones can be operated at a moderate temperature and between 0 and 100 p.s.i.g. Somewhat higher extraction temperatures are required with the less volatile separation agents. Useful combinations of solvent and separation agents include diisopropyl-amine-propane and butyl alcohol-butane.

The process layout and equipment must be especially designed for or adapted to the particular brine source, the solvent and salting out agent to be utilized, and the ultimate use of the water, that is, whether for human consumption, irrigation, industrial or other use.

FIGURE 2 is a more detailed schematic flow diagram showing the operation of an integrated process taking into consideration the requirements for heat economies and the fact that non-ideal solvents and separation agents are used. There are three stages illustrated for purposes of simplicity, however, in actual operation there will be from 5 to 20 stages or more in a plant purifying water according to this process. As in any flash evaporation system the heat required is an inverse function of the number of stages.

Some of the process equipment is also schematically disclosed in more detail, in FIGURE 2. This process will be described using sea water as the feed, normal butyl alcohol as the solvent and iso-butane as the separation agent. The same numbers will be used in this figure as used in FIGURE 1, to the extent that they serve equivalent functions in each drawing. In FIGURE 2 the top portion of the drawing represents the extraction system which forms the basis of this invention and the bottom portion of the drawing illustrates schematically a conventional solvent recovery system for recovering solvent from the product water and the waste concentrated brine stream.

A reflux column 35 has been added to the extraction system as well as heat exchangers, 36, 37 and 38. Each of the paired extraction and separation stages or units, for example, 13 and 23, are located in a single column, 32, 33 and 34 respectively, separated by a bubble plate 39 with liquid-vapor contacting baffles or plates, 40, in the condensation portion.

Cool sea water 10 is mixed with the water rich, butanol stream 20 coming from extraction stage 13 and is introduced into the bottom of the reflux column 35. The initial extraction of water from the sea water by the butanol occurs in this mixing operation as well as an initial heating of the sea water and a cooling and final enrichment of the butanol-water stream. This warmed, slightly concentrated sea water forms as a phase 46 at the bottom of the column and is withdrawn and passed 42 through heat exchanger 36 in which heat is recovered from both the waste brine stream 12 and the product water stream 11 prior to their leaving the system. This further warmed sea water 43 coming from heat exchanger 36 is mixed with the butanol-butane-water stream 41 coming from extraction stage 14 and introduced as a joint stream into extraction stage 13 in which the final portion of butane flashes off 26 and an equivalent quantity of water is dissolved by the butanol-water phase. The latter separates from the brine and lies 44 on top of the brine phase 45. Butane vapor passes from 13 through bubble plate 39 into condensation stage 23 at a lower temperature and pressure. There it comes into contact with the liquid-vapor contacting plates or devices 40, condenses into the butanol and causes a separation of some water into a distinct phase.

The enriched brine from extraction stage 13 is taken from the bottom of the column, introduced into heat exchanger 37 for recovery of additional heat from the product water stream and waste brine stream and is mixed with the butanol-butane-water stream coming from extraction stage 15. This mixture is introduced into extraction stage 14 maintained at a higher temperature and pressure than 13. An increment of butane flashes off and an increment of water is dissolved from the brine. These butane vapors 27 pass through the bubble plate into condensation stage 24 and into liquid-vapor contact with the two phase stream 48 from 23. This butane condenses into the butanol in 24 causing an increase in the water phase. The two phase stream from the bottom of 24 is introduced into the top of the next condensation stage 25 for further separation of water from butanol.

The brine solution, after extracting additional heat from from the water product and waste brine in 38, is mixed with the heated recycle butanol-butane stream 16 and introduced into extraction stage 15. Here the initial extraction of water by the butanol and the final brine enrichment takes place and the initial flash evaporation of some of the butane 28 occurs. These butane vapors enter condensation stage 25 causing separation of the final quantity of water to be recovered from the butanol. The two phase bottoms stream 29 is gravity separated in 30 after being heated in condenser 73 associated with the solvent recovery system. The heated butanol-butane is then recycled 16 through the extraction zone. The water phase 50 and concentrated brine phase 51 are then treated for recovery of solvent. The recovery of solvent from the water and brine does not form a part of my invention, however, the stripper system of FIGURE 2 will be described later to disclose its coordination with my extraction process.

In FIGURE 2 the center process stage 33 is enclosed by box 54, to indicate that it represents one or more middle stages of vaporization-extraction and condensation-separation. In actual practice there will ordinarily be from 5 to 20 or more total process stages. The number of stages in any particular purification plant depends upon a critical evaluation of all factors with economy being the overriding consideration. Regardless of the number of stages, there will be a decreasing pressure and temperature in the vaporization-extraction zone in the direction of solvent flow as required by flash evaporation technology and an increasing temperature and pressure in the condensation-separation zone in the direction of solvent flow. It is the temperature difference in each stage, always somewhat lower in the condensation portion which provides the driving force for the entire process and this temperature difference is obtained by the heat imput to the system.

The recovery of solvent is accomplished in water stripper 60 and brine stripper 61. Steam 62 is introduced into stripper 60 in contact with water, preheated in heat exchanger 63 and by small reflux stream 64. The overhead solvent-water solution 65 minus the small reflux stream 64 is recycled back to separator 30 after being condensed 66 by the brine in stripper 61. The heated water product 68 also passes in heat exchange 69 with the brine and then into heat exchangers 63, 38, 37 and 36 before going 11 to water storage. Brine 51 is heated 70 by the waste brine product 71 prior to stripper 61. The stripped waste brine 71 then passes through heat exchangers 70, 38, 37 and 36 before being discarded 12. The overhead, stripped solvent-water vapor 72 is condensed into the two phase stream 29 leaving the final condensation zone 25 in condenser 73. Strippers 60 and 61 can be multiple effect strippers if desired. Steam 62 used in the stripper section represents the total heat imput into the entire system, which serves as the driving force. This heat, after effecting the stripping, is introduced into the extraction-system, by condensing the hot stripped solvent into the recycle solution in 73 and by recovery of heat from the product water and waste brine in heat exchangers 36, 37 and 38.

Other stripping methods such as adsorption or air stripping may be utilized. Stream 29 may also be directly steam heated in condenser 73 or by any available low temperature waste heat to provide the driving force for my extraction process. Low temperature, low cost waste heat may be used to good advantage in my process. If the selectivity of the solvent used is such that it cannot carry the brine content of the water down to the desired level, a reflux column 35 may be used in which a small portion 76 of water phase is recycled from the bottom of the first or subsequent condensation units to strip salt by counter current flow from the solvent-water stream 22 going to the condensation zone.

The following is a specific example of the operating conditions for a plant designed in accordance with FIGURE 2 to produce a water product containing 500 p.p.m. of salt from sea water having magnesium ion reduced by pretreatment, with the product water and waste brine stripped down to 5 p.p.m. solvent. Diisopropyl amine is used as the solvent and propane as the salting out agent. The recycle solution in equilibrium with the sea water 46 in the bottom of reflux column 35 at 90° F. and 0 p.s.i.g. propane pressure contains 0.25 pound of water and 0.038 pound of propane per pound of amine. Recycle stream 16 contains 0.06 pound of water and 0.218 pound of propane per pound of amine when the equilibrium conditions in separator 30 are 120° F. and 91 p.s.i.g. propane pressure.

The following chart provides the process operating conditions with 13 evaporation stages, that is 54 represents 11 stages. All flow quantities are in pounds per pound of water product 11. The heat input is 62 B.t.u. per pound of water-product at a steam pressure of 10 p.s.i.g.

| Stream | Feed | Output | Reflux | Process Streams | | | |
|---|---|---|---|---|---|---|---|
| | 10 | 12 | 11 | 76 | 20 | 22 | 29 | 16 |
| Salt* | 35 | 120 | 0.5 | 0.5 | | | | |
| T, °F | 55 | 99 | 99 | 95 | 100 | 90 | 110 | 120 |
| P, p.s.i.g. | 10 | | | 10 | 10 | 10 | 77 | 91 |
| Solvent | | | | 0.04 | 5.65 | 5.69 | 5.65 | 5.65 |
| Water | | | 1.0 | 0.36 | 1.41 | 1.70 | 1.31 | 0.31 |
| Propane | | | | | 0.22 | 0.22 | 1.23 | 1.23 |
| Flow | 1.41 | 0.41 | 1.0 | 0.40 | 7.28 | 7.61 | 8.19 | 7.19 |

*Parts per thousand.

An alternate procedure for purifying saline water by my invention is schematically illustrated in FIGURE 3. The same numbers will be utilized in this drawing as were used in FIGURE 1 to the extent that they serve equivalent functions. The upper portion is the condensation-extraction zone in which a vapor is condensed and water is extracted by a recycle solution and the lower portion is the vaporization-separation zone in which a component is vaporized and water is separated out from the recycle solution. Saline water 10 is fed to the condensation-extraction zone and passes through three separate stages or units 80, 81 and 82 having a decreasing pressure and temperature in the direction of brine flow in direct contact with recycle solution 83. As the recycle solution passes through the condensation-extraction zone increments of vapor 84, 85 and 86 condense into the recycle solution causing increments of water 87, 88 and 89 to be extracted from the saline solution.

After the water-rich recycle solution 93 leaves the condensation-extraction zone it is heated in 31 and passed through the evaporation-separation zone comprising 90, 91 and 92 having a decreasing temperature and pressure in the direction of flow of the recycle solution. As the solution progresses through the evaporation-separation zone increments of solvent 86, 85 and 84 flash evaporate in each stage causing the solution to lose its solubility for a portion of the water thus forming a separate water phase. The two phase stream leaving the evaporation-separation zone is cooled 21 prior to separation 30 into the water product 11 and solution 83 for recycling through the condensation-extraction zone.

This figure also represents a simplified idealized situation. Both the product water and the waste brine must be stripped of solvent and heat economy must be accomplished. However, a complete process layout for the practical utilization of this modification is readily apparent to those skilled in the art from this description and the more detailed description of FIGURE 2.

The recycle solution in this modification must be partially miscible with water at the operating temperatures, preferably having a low solubility in water and characterized by a maximum change in solubility for water with change in concentration of volatile component and maximum change in solubility for water with temperature change. Furthermore, it is desirable that it possess a good selectivity for water. Other desired characteristics are obvious. It is preferred that the recycle solution contain two solvent components, the first in much greater amount than the second. The second component when condensed into the recycle solution will increase its solubility for water out of proportion to the amount of the condensed component. It is in effect a solubility enhancer. An example of a solution operating on this principle is an isobutanol-acetone solution. The solubility of the recycle solution for water is markedly increased by the addition of relatively small amounts of acetone. Thus, when a relatively small amount of acetone is vaporized in the vaporization-separation zone a relatively large quantity of water separates from the solution into a separate phase and when the acetone vapor is condensed in the condensation-extraction zone a correspondingly large quantity of water is dissolved from the saline water by the recycle solution.

It is to be understood in either modification that under usual operating conditions only a portion of the separation agent will be vaporized in the vaporization zone. The remainder will be carried with the recycle solution through the entire cycle.

My invention combines the best features of flash evaporation and extraction in a process having a number of advantages in addition to those derived from this combination due to the novel manner in which the combination is achieved. Thus, the heat economy and equipment simplicity of multi-stage flash evaporation are combined with the minimum total heat transfer and direct contact advantages of extraction.

Good heat economy results in my process because the heat of solution of water in solvent which is released in the evaporation zone is transferred by the flash evaporation of a low boiling material and is recovered at a temperature only slightly lower than the temperature at which it is released. Furthermore, evaporation of this low boiling material instead of water permits the use of simpler equipment and permits heat to be transferred by direct contact.

In addition, my process takes advantage of the change of solubility resulting from the interaction of two or more materials and also takes advantage of the change in solubility of water which results from a change in temperature of solution.

It is a highly versatile process. It can be adapted to various brine feeds of varying salt content. It is also versatile because it permits use of a variety of solvents and separation agents to accomplish the purification. It may be operated at a temperature well below ordinary distillation systems, thereby avoiding the formation of salt scale on the equipment and reducing corrosion almost to insignificance. The equipment is relatively uncomplicated since it is operated under slight pressure or slight vacuum. The overall cost of the equipment is relatively economical as compared with systems which require vacuum or vapor compressing equipment. In view of the relative absence of corrosion and the simplicity of the equipment the operating expenses of this process are at a minimum. Thus, I have provided a process for the purification of saline solutions which is economical in the equipment required for its operation, which is economical in its energy requirements, and which is economical to operate.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

What I claim is:

1. In the purification of saline water, the process which comprises contacting saline water in a first zone with a water solvent containing a salting out agent in solution under conditions of pressure and temperature whereby salting out agent is flash evaporated from said solution and concurrently therewith water is extracted from said saline water by said solvent, and condensing said vaporized salting out agent in a separate zone into a second solution containing said solvent saturated with water whereby water separates out of said second solution as a distinct phase, said solvent (1) being partially miscible with water at the temperature of operation, (2) being capable of selectively dissolving water from a saline solution, and (3) being a solvent for said salting out agent, and said salting out agent (1) being substantially immiscible with water, (2) being capable of dissolving in said solvent and forcing water out of solution, and (3) having a greater volatility than said solvent.

2. A method for the purification of saline water comprising passing saline water through a series of extraction stages counter current to and in intimate contact with a water solvent containing a salting out agent under conditions of pressure and temperature whereby a portion of said salting out agent is flash evaporated and water is extracted from said saline water by said solvent in each of said extraction stages, passing said solvent containing water dissolved therein through a series of condensation stages, condensing said salting out agent vapors into said solvent in said condensation stages whereby water separates as a distinct phase, and recovering said water phase, said solvent (1) being partially miscible with water at the temperature of operation, (2) being capable of selectively dissolving water from a saline solution, and (3) being a solvent for said salting out agent, and said salting out agent (1) being substantially immiscible with water, (2) being capable of dissolving in said solvent and forcing water out of solution, and (3) having a greater volatility than said solvent.

3. In the purification of saline water the process which comprises contacting saline water with a solution containing a water solvent and a salting out agent in a first zone and vaporizing salting out agent from said solution whereby water is extracted from said saline solution by said solvent in said first zone, and condensing said vaporized salting out agent into said solution containing said extracted water in a separate zone whereby water separates from said solution as a separate phase, said solvent (1) being partially miscible with water at the temperature of operation, (2) being capable of selectively dissolving water from a saline solution, and (3) being a solvent for said salting out agent, and said salting out agent (1) being substantially immiscible with water, (2) being capable of dissolving in said solvent and forcing water out of solution, and (3) having a greater volatility than said solvent.

4. In the purification of saline water, the process which comprises contacting saline water with a separate liquid phase water solvent in a first zone and condensing solvent vapors therein whereby water is extracted from said saline water to form a water-rich solution, and vaporizing solvent from said water-rich solution in a separate zone, whereby water separates from said solvent as a separate phase.

5. A method for the purification of saline water comprising passing saline water through a series of extraction stages counter current to and in intimate contact with separate liquid phase recycle solution containing a water solvent and enriching the water solvent content of said recycle solution by condensing vaporized water solvent in each stage, whereby water is extracted by said solvent in each of said extraction stages, and passing said enriched recycle solution containing water dissolved therein through a series of evaporation stages under conditions of temperature and pressure whereby a portion of said water solvent is vaporized and said water separates out from said enriched recycle solution as a separate phase.

6. A process in accordance with claim 5 in which said recycle solution contains a salting out agent that is substantially immiscible with water, soluble in said water solvent and having a lower volatility than said water solvent.

7. A continuous process for the purification of saline water comprising passing saline water through a series of extraction stages, passing a solvent containing a salting out agent through said series of extraction stages in intimate contact with said saline water and a reverse order thereto, said solvent (1) being partially miscible with water at the temperature of operation, (2) being capable of selectively dissolving water from a saline solution, and (3) being a solvent for said salting out agent, and said salting out agent (1) being substantially immiscible with water, (2) being capable of dissolving in said solvent and forcing water out of solution, and (3) having a greater volatility than said solvent, maintaining the pressure and temperature in each said extraction stage whereby a portion of said salting out agent is flash evaporated and a portion of water is extracted from said saline water by said solvent to water enrich said solvent in each succeeding stage, cooling said water-enriched solvent after passage through said extraction zone, passing said cooled, water-enriched solvent through a series of condensation stages associated with each of said extraction stages and condensing the salting out agent vapors from each of said extraction stages into said solvent whereby an increment of water separates out as a separate phase in each succeeding condensation stage, recovering said water, and heating said solvent containing said salting out agent for recycling through said extraction zone.

8. A process for the purification of saline water in accordance with claim 7 in which said solvent is an alkyl alcohol which is more volatile than water and said salting out agent is an alkane which is more volatile than said solvent.

9. A process for the purification of saline water in accordance with claim 7 in which said solvent is an alkyl alcohol which is more volatile than water and said salting out agent is a halogenated alkane which is more volatile than said solvent.

10. A process for the purification of saline water in accordance with claim 7 in which said solvent is a ketone which is more volatile than water and said salting out agent is an alkane which is more volatile than said solvent.

11. A process for the purification of saline water in accordance with claim 7 in which said solvent is a ketone which is more volatile than water and said salting out agent is a halogenated alkane which is more volatile than said solvent.

12. A process for the purification of saline water in accordance with claim 7 in which said solvent is an amine which is more volatile than water and said salting out agent is an alkane which is more volatile than said solvent.

13. A process for the purification of saline water in accordance with claim 7 in which said solvent is an amine which is more volatile than water and said salting out agent is a halogenated alkane which is more volatile than said solvent.

References Cited

UNITED STATES PATENTS

| | | | |
|---|---|---|---|
| 2,967,825 | 1/1961 | Baniel | 23—312 |
| 2,974,102 | 3/1961 | Williams | 210—59 |
| 3,017,253 | 1/1962 | Coleby | 23—270.5 |
| 3,214,371 | 10/1965 | Tuwiner | 210—60 |

OTHER REFERENCES

Report #22, Research on Liquid-Liquid Extraction for Saline Water Conversion Office of Saline Water, Research and Development Progress Report, December 1958, pages 2–3 relied upon.

JOSEPH SCOVRONEK, *Primary Examiner.*

MORRIS O. WOLK, *Examiner.*

E. G. WHITBY, *Assistant Examiner.*